(12) United States Patent
Yoon et al.

(10) Patent No.: US 7,995,900 B2
(45) Date of Patent: Aug. 9, 2011

(54) METHOD OF PRESENTING AUXILIARY DATA FOR AN INTERACTIVE RECORDING MEDIUM

(75) Inventors: Woo Seong Yoon, Namyangjoo-si (KR); Jea Yong Yoo, Seoul (KR); Seung Hoon Lee, Sungnam-si (KR); Limonov Alexandre, Seoul (KR)

(73) Assignee: LG Electronics Inc., Seoul (KR)

( * ) Notice: Subject to any disclaimer, the term of this patent is extended or adjusted under 35 U.S.C. 154(b) by 1734 days.

(21) Appl. No.: 10/729,083

(22) Filed: Dec. 4, 2003

(65) Prior Publication Data

US 2004/0114906 A1 Jun. 17, 2004

(30) Foreign Application Priority Data

Dec. 9, 2002 (KR) .................. 10-2002-0078023

(51) Int. Cl.
*H04N 5/94* (2006.01)
*H04N 9/80* (2006.01)
*H04N 5/93* (2006.01)

(52) U.S. Cl. ......... 386/248; 386/239; 386/240; 386/353

(58) Field of Classification Search .............. 386/95, 386/126, 239, 240, 248, 353
See application file for complete search history.

(56) References Cited

U.S. PATENT DOCUMENTS

| | | | |
|---|---|---|---|
| 5,687,160 A | 11/1997 | Aotake et al. |
| 5,808,662 A | 9/1998 | Kinney et al. |
| 5,815,194 A | 9/1998 | Ueda |
| 5,909,551 A | 6/1999 | Tahara et al. |
| 5,929,857 A | 7/1999 | Dinallo et al. |
| 5,987,525 A | 11/1999 | Roberts et al. |
| 5,995,091 A | 11/1999 | Near et al. |
| 6,061,680 A | 5/2000 | Scherf et al. |
| 6,130,988 A | 10/2000 | Jeong |
| 6,138,175 A | 10/2000 | deCarmo |
| 6,161,132 A | 12/2000 | Roberts et al. |
| 6,162,132 A | 12/2000 | Yoneyama |
| 6,230,207 B1 | 5/2001 | Roberts et al. |
| 6,240,459 B1 | 5/2001 | Roberts et al. |
| 6,564,255 B1 | 5/2003 | Mobini et al. |
| 6,580,870 B1 | 6/2003 | Kanazawa et al. |
| 6,654,769 B2 | 11/2003 | Ito et al. |
| 6,735,152 B2 | 5/2004 | Sato et al. |

(Continued)

FOREIGN PATENT DOCUMENTS

EP 0 737 009 A2 10/1996

(Continued)

OTHER PUBLICATIONS

Mimura, DVD-Video Format, 1997, pp. 291-294.

*Primary Examiner* — Thai Tran
*Assistant Examiner* — Hung Q Dang
(74) *Attorney, Agent, or Firm* — Birch, Stewart, Kolasch & Birch, LLP

(57) ABSTRACT

A method of presenting auxiliary data for an interactive recording medium is disclosed. In an interactive recording medium reproducing apparatus that reproduces A/V data and contents data recorded on an interactive recording medium and contents data provided by a contents providing server, the contents data provided by the contents providing server is presented appropriately according to the attributes of the contents data by using attribute information for the contents data.

24 Claims, 6 Drawing Sheets

U.S. PATENT DOCUMENTS

| | | |
|---|---|---|
| 6,836,273 B1 | 12/2004 | Kadono |
| 6,907,616 B2 | 6/2005 | Yamauchi et al. |
| 6,957,387 B2 | 10/2005 | Barbieri |
| 7,017,175 B2 | 3/2006 | Alao et al. |
| 7,127,736 B2 | 10/2006 | Kondo et al. |
| 7,188,193 B1 | 3/2007 | Getsin et al. |
| 7,197,234 B1 | 3/2007 | Chatterton |
| 7,216,149 B1 * | 5/2007 | Briscoe et al. ............ 709/217 |
| 7,274,740 B2 | 9/2007 | Van Beek et al. |
| 7,313,809 B1 | 12/2007 | Mohan et al. |
| 7,376,333 B2 | 5/2008 | Chung et al. |
| 7,379,661 B2 * | 5/2008 | Lamkin et al. ............ 386/125 |
| 7,392,481 B2 | 6/2008 | Gewickey et al. |
| 7,409,111 B2 | 8/2008 | Sakimura et al. |
| 7,448,021 B1 | 11/2008 | Lamkin et al. |
| 7,451,453 B1 | 11/2008 | Evans et al. |
| 7,466,904 B2 | 12/2008 | Yoo et al. |
| 2001/0056580 A1 | 12/2001 | Seo et al. |
| 2002/0037159 A1 | 3/2002 | Goto et al. |
| 2002/0049981 A1 | 4/2002 | Tzou |
| 2002/0078144 A1 * | 6/2002 | Lamkin et al. ............ 709/203 |
| 2002/0080753 A1 | 6/2002 | Lee |
| 2002/0103855 A1 | 8/2002 | Chatani |
| 2002/0106193 A1 | 8/2002 | Park et al. |
| 2002/0112247 A1 | 8/2002 | Horner et al. |
| 2002/0122658 A1 | 9/2002 | Fukuda et al. |
| 2002/0147827 A1 | 10/2002 | Breiter et al. |
| 2002/0152286 A1 | 10/2002 | Peddu et al. |
| 2003/0016943 A1 | 1/2003 | Chung et al. |
| 2003/0028892 A1 | 2/2003 | Gewickey |
| 2003/0039187 A1 | 2/2003 | Geutskens |
| 2003/0161615 A1 | 8/2003 | Tsumagari et al. |
| 2003/0229679 A1 | 12/2003 | Yoo et al. |
| 2004/0057699 A1 | 3/2004 | Kim et al. |
| 2004/0096199 A1 | 3/2004 | Chou et al. |
| 2004/0133661 A1 | 7/2004 | Yoon et al. |
| 2004/0247284 A1 | 12/2004 | Yamasaki |
| 2005/0081699 A1 | 4/2005 | Beker |
| 2005/0118417 A1 | 6/2005 | Min et al. |
| 2005/0210505 A1 | 9/2005 | Chiu et al. |
| 2006/0031188 A1 | 2/2006 | Lara et al. |
| 2006/0117344 A1 | 6/2006 | Lamkin et al. |
| 2006/0143268 A1 | 6/2006 | Chatani |
| 2006/0242161 A1 | 10/2006 | Ten Kate et al. |
| 2007/0122117 A1 | 5/2007 | Kimura |
| 2008/0131093 A1 | 6/2008 | Mohan et al. |
| 2008/0177863 A1 | 7/2008 | Mohan et al. |

FOREIGN PATENT DOCUMENTS

| | | |
|---|---|---|
| EP | 0737009 B1 | 10/1996 |
| EP | 0 762 422 A2 | 3/1997 |
| EP | 1003304 A1 | 5/2000 |
| EP | 1 193 712 A2 | 4/2002 |
| EP | 1 229 542 A2 | 8/2002 |
| EP | 1 357 749 A1 | 10/2003 |
| JP | 06-141252 A | 5/1994 |
| JP | 08-102940 A | 4/1996 |
| JP | 8-223556 A | 8/1996 |
| JP | 08-336104 | 12/1996 |
| JP | 9-128408 A | 5/1997 |
| JP | 10-136314 A | 5/1998 |
| JP | 11-98467 A | 4/1999 |
| JP | 11-161663 A | 6/1999 |
| JP | 11271071 A | 10/1999 |
| JP | 2000-32429 A | 1/2000 |
| JP | 2000-099758 A | 4/2000 |
| JP | 2000-295578 A | 10/2000 |
| JP | 2001-223987 A | 8/2001 |
| JP | 2001-285860 A | 10/2001 |
| JP | 2001-313930 A | 11/2001 |
| JP | 2002-023719 A | 1/2002 |
| JP | 2005-501363 A | 1/2005 |
| JP | 2005-501364 A | 1/2005 |
| JP | 2005-506785 A | 3/2005 |
| KR | 10-0195106 | 6/1999 |
| KR | 99/0195106 | 6/1999 |
| KR | 2000-0030073 A | 6/2000 |
| KR | 20020059706 A | 7/2002 |
| KR | 20040049740 A | 6/2004 |
| WO | WO 99/59290 | 11/1999 |
| WO | WO-99/59290 A1 | 11/1999 |
| WO | WO-00/63915 A1 | 10/2000 |
| WO | WO-02/21529 A1 | 3/2002 |
| WO | WO-02/50744 A2 | 6/2002 |
| WO | WO 02/063878 A2 | 8/2002 |
| WO | WO-2004/036575 A1 | 4/2004 |
| WO | WO-2004/036576 A1 | 4/2004 |
| WO | WO-2004/051644 A1 | 6/2004 |

* cited by examiner

METHOD OF PRESENTING AUXILIARY DATA FOR AN INTERACTIVE RECORDING MEDIUM

BACKGROUND OF THE INVENTION

1. Field of the Invention

The present invention relates to a method of presenting A/V data and contents data recorded on an interactive recording medium and contents data provided by a contents providing server connected through the Internet.

2. Description of the Related Art

High-density recording media such as optical disks capable of recording large amounts of data are being widely used. The DVD (digital versatile disc), which is an optical recording medium capable of recording large amounts of high-quality digital video and audio data, is one example of these high-density recording media.

The DVD includes a data stream recording area in which digital A/V data streams are recorded and a navigation data recording area in which navigation data required for playback control of the A/V data is recorded.

When a DVD is loaded into a DVD reproducing apparatus, the DVD reproducing apparatus first reads the navigation data recorded in the navigation data recording area and stores the navigation data in an internal memory. The DVD reproducing apparatus then begins reproduction of the A/V data recorded in the data stream recording area using the stored navigation data, thereby providing various functions of the DVD to a viewer.

The development of new interactive DVDs is being progressing rapidly. Unlike the DVD, the interactive DVD (I-DVD) contains additional contents data, which is detailed information about A/V data recorded thereon, and provides the contents data through a user interface. The contents data may be recorded on the I-DVD as data files such as html files.

In addition, a method for obtaining additional contents data from a contents providing server connected through the Internet and presenting the contents data while A/V data and contents data recorded on the I-DVD are reproduced is under development. However, an effective method for presenting the contents data appropriately according to the attributes is not yet available.

SUMMARY OF THE INVENTION

It is an object of the present invention to provide a method of presenting auxiliary contents data recorded on an interactive recording medium or contents data provided by an external contents providing server appropriately according to the attributes using attribute information recorded on the interactive recording medium or provided by the contents providing server.

The method of reproducing an interactive recording medium in a reproducing apparatus in accordance with the present invention comprises the steps of (a) checking attribute information for auxiliary contents data of A/V data recorded on the interactive recording medium and (b) determining a presentation method for the auxiliary contents data based on the attribute information and presenting the auxiliary contents data accordingly.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
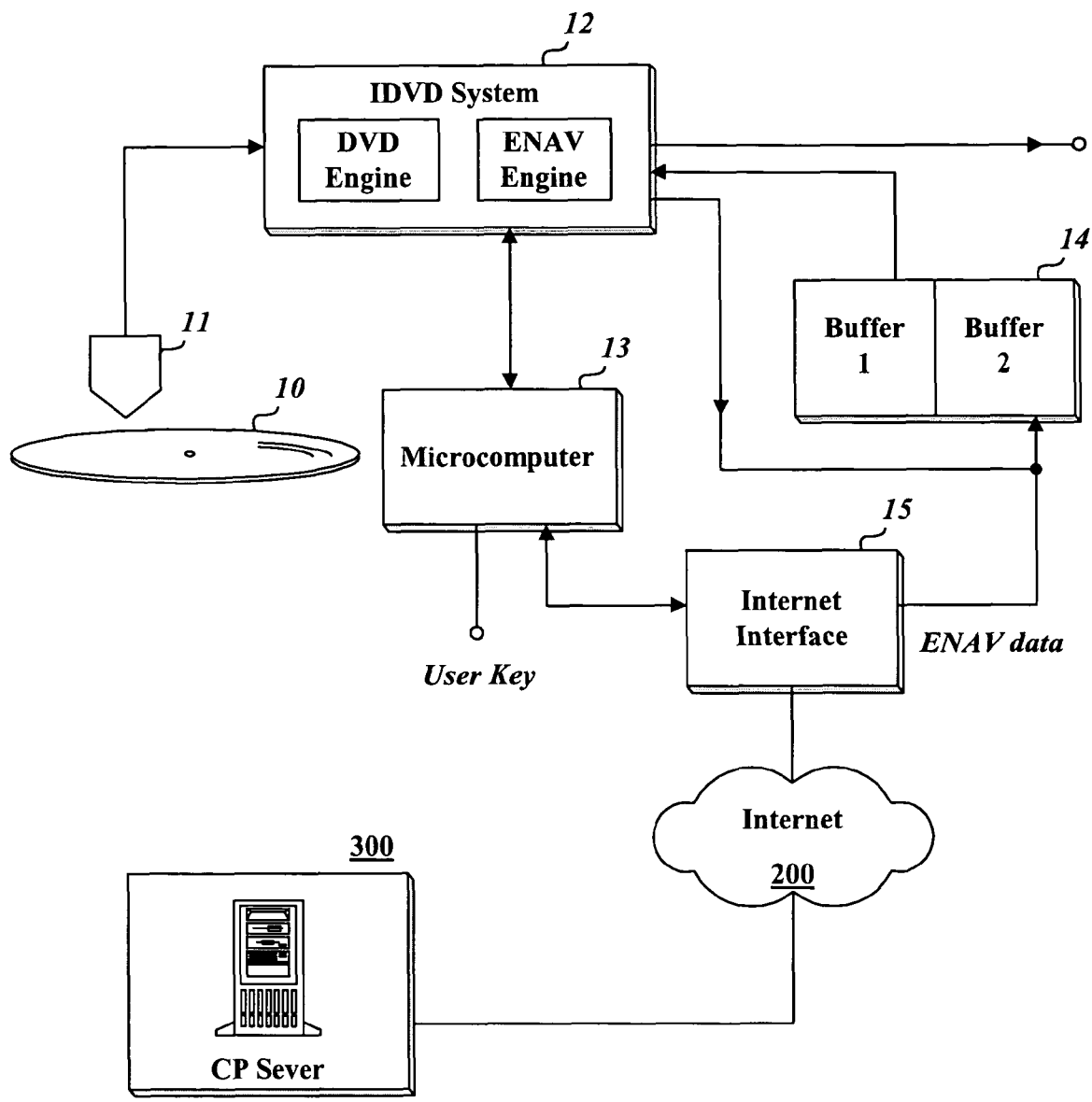
FIG. 1 illustrates an interactive optical disk reproducing apparatus in which the present invention may be advantageously embodied.

FIG. 1 illustrates an interactive optical disk reproducing apparatus in which the present invention may be advantageously embodied. The reproducing apparatus 100 comprises an optical pickup 11, an IDVD system 12, a microprocessor 13, a buffer memory 14, and an Internet interface 15 through which the apparatus 100 is connected to a contents providing server 300.

The IDVD system 12 includes a DVD engine for reproducing A/V data recorded on an I-DVD 10 and an enhanced navigation (ENAV) engine for reproducing contents data provided by the contents providing server 300 or contents data recorded on the I-DVD 10.

The IDVD system 12 outputs the contents data in synchronization with the A/V data reproduced from the IDVD 10. As shown in FIG. 1, the reproducing apparatus 100 is connected to the contents providing server 300 through the Internet interface 15 by the mutual operations of the microprocessor 13 and the ENAV engine included in the IDVD system 12.

ENAV contents data, which is additional contents data associated with the A/V data reproduced from the I-DVD 10, is downloaded from the contents providing server 300 and then temporarily stored in the buffer memory 14. The buffer memory 14 can be logically divided into a first buffer (buffer 1) and a second buffer (buffer 2).

The ENAV engine in the IDVD system 12 outputs the A/V data from the I-DVD 10 in synchronization with the ENAV contents data from the I-DVD 10 or outputs the A/V data from the I-DVD 10 in synchronization with the ENAV contents downloaded from the contents providing server 300.

The ENAV contents data recorded on the I-DVD 10 is organized into a plurality of data files and ENAV navigation information for reproducing the data files in synchronization with A/V data may also be recorded thereon. The contents providing server 300 provides various ENAV contents data associated with the A/V data recorded on the I-DVD 10 as a plurality of data files and provides ENAV navigation information for reproducing the data files in synchronization with A/V data. The navigation information may be provided all at once or may be divided into a plurality of pieces and provided one by one when needed.

Figure 2:
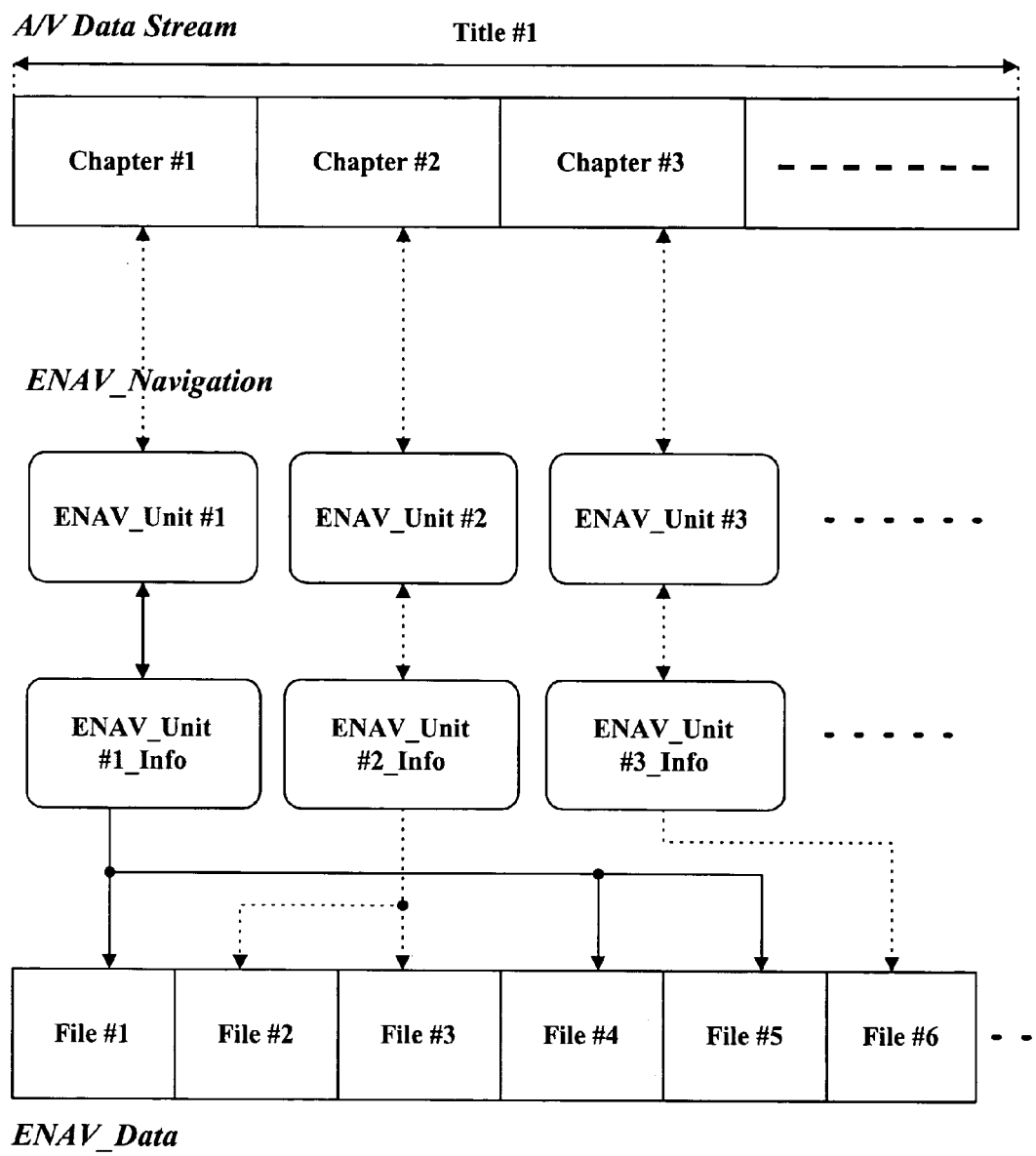
FIG. 2 illustrates the relationship among an A/V data stream, contents navigation information, and contents data files in accordance with the present invention.

As shown in FIG. 2, for example, a title of the I-DVD 10 is organized into a plurality of individual chapters (Chapter#1, Chapter#2, . . . ) and one or more data files (File#1, File#2, . . . ) corresponding to each of the chapters are organized as an ENAV unit. Navigation information for managing the data files included in the ENAV unit is provided as ENAV unit information (ENAV_Unit_Info).

The multiple pieces of ENAV unit information (ENAV_Unit#1_Info, ENAV_Unit#2_Info, . . . ) are defined as a linked list and transmitted along with the ENAV contents data files or transmitted before the ENAV contents data files are sent.

Figure 3:
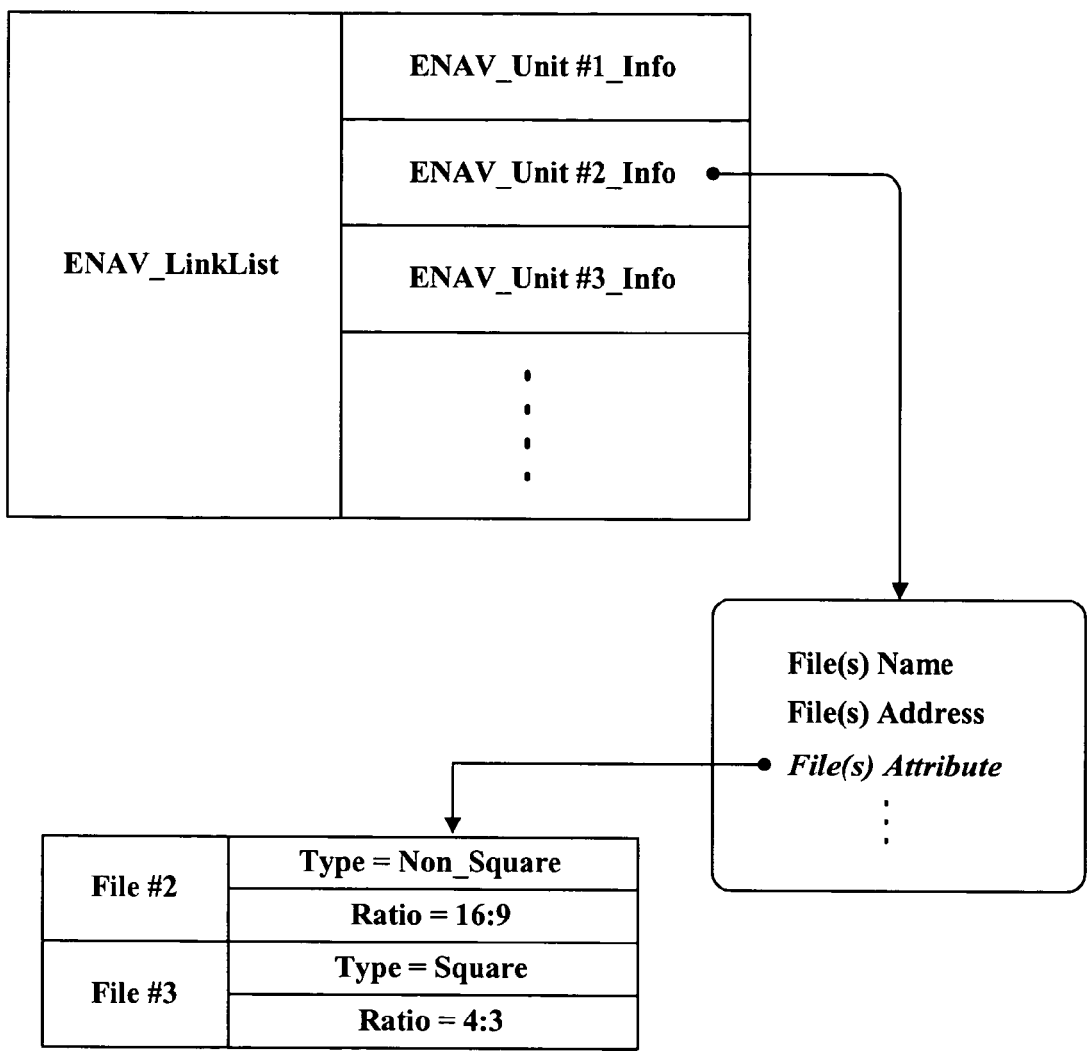
FIG. 3 illustrates a first embodiment of a method for recording attribute information for contents data files in accordance with the invention.

As shown in FIG. 3, the ENAV unit information includes file names of data files included in the associated ENAV unit (File(s) Name), addresses of the data files in the contents providing server 300 (File(s) Address), and attribute information for the data files (File(s) Attribute).

For example, the 'File(s) Attribute' field for File#2 includes the information that 'Type=Non_Square' indicating the image type and 'Ratio=16:9' indicating the aspect ratio and the 'File(s) Attribute' field for File#3 includes the information that 'Type=Square' and 'Ratio=4:3'.

The microprocessor 13 controls presentation of the data files using the fields of 'File(s) Name' and 'File(s) Address' included in the ENAV unit information so that the data files reproduced by the ENAV engine may be presented in synchronization with the chapters of the AV data stream reproduced by the DVD engine.

Also, the microprocessor 13 controls the image of the contents data reproduced by the ENAV engine to be presented with an appropriate image type and aspect ratio using the image type and aspect ratio information of the 'File(s) Attribute' field included in the ENAV unit information.

Figure 4:
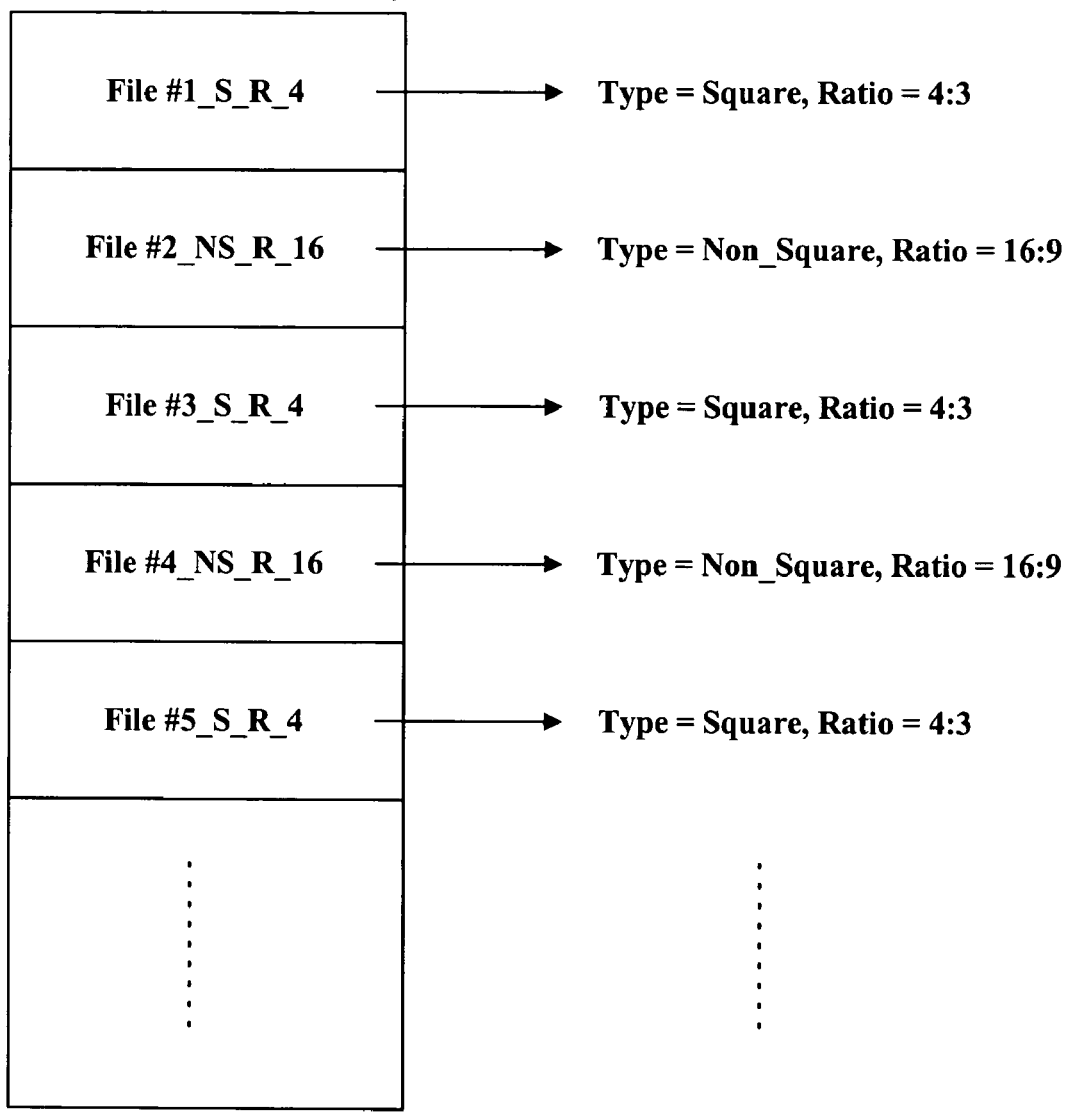
FIG. 4 illustrates a second embodiment of a method for recording attribute information for contents data files in accordance with the invention.

Instead of recording the attribute information explicitly, the attribute information may be implicitly recorded such that it can be identified indirectly from the names of the data files. As shown in FIG. 4, for example, naming File#1 'File#1_S_R__4' makes it possible to identify the information that 'Type=Square' and 'Ratio=4:3' for File#1.

Likewise, the image type and aspect ratio of File#2 may be identified by naming File#2 'File#2_NS_R16', which indicates that 'Type=Non_Square' and 'Ratio=16:9'. The microprocessor 13 determines the image type and aspect ratio of a data file from its name and controls the image of the contents data reproduced by the ENAV engine to be presented with the appropriate attributes in conjunction with the A/V data reproduced from the I-DVD 10.

Figure 5:
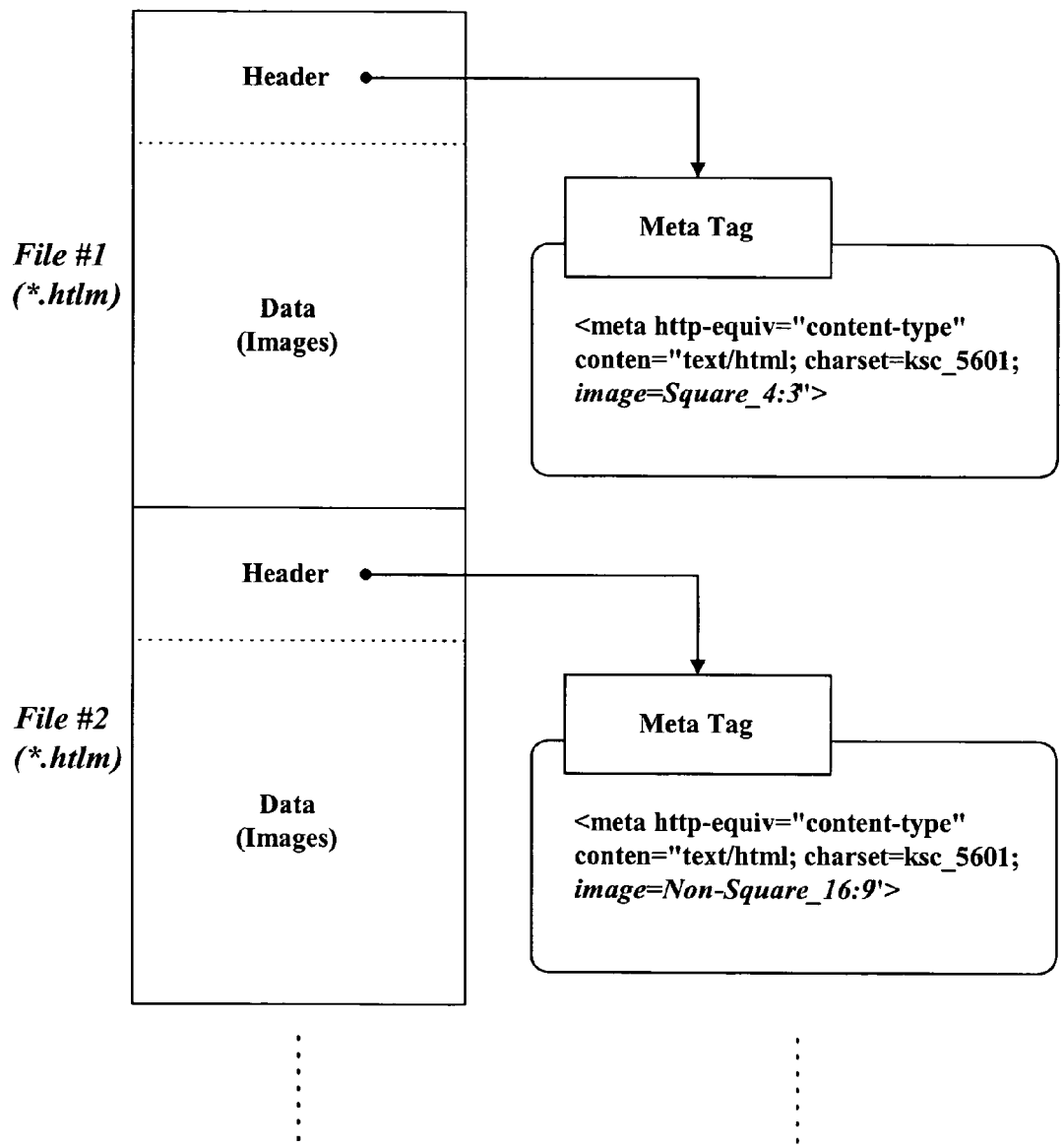
FIG. 5 illustrates a third embodiment of a method for recording attribute information for contents data files in accordance with the invention.

The attribute information may be included in meta tag information as shown in FIG. 5. For example, if the contents data files are html files, the image type and aspect ratio for an html data file may be recorded in the meta tag information included in the header area thereof.

The attribute information of 'image=Square__4:3' is added to the meta tag information included in the header area of File#1 to indicate that 'Type=Square' and 'Ratio=4:3'. The attribute information of 'image=Non_Square__16:9' is added to the meta tag information included in the header area of File#2 to indicate that 'Type=Non_Square' and 'Ratio=16:9'.

The microprocessor 13 determines the image type and aspect ratio of a data file from the meta tag information and controls the image of the contents data reproduced by the ENAV engine to be presented with the appropriate attributes in conjunction with the A/V data reproduced from the I-DVD 10.

Figure 6:
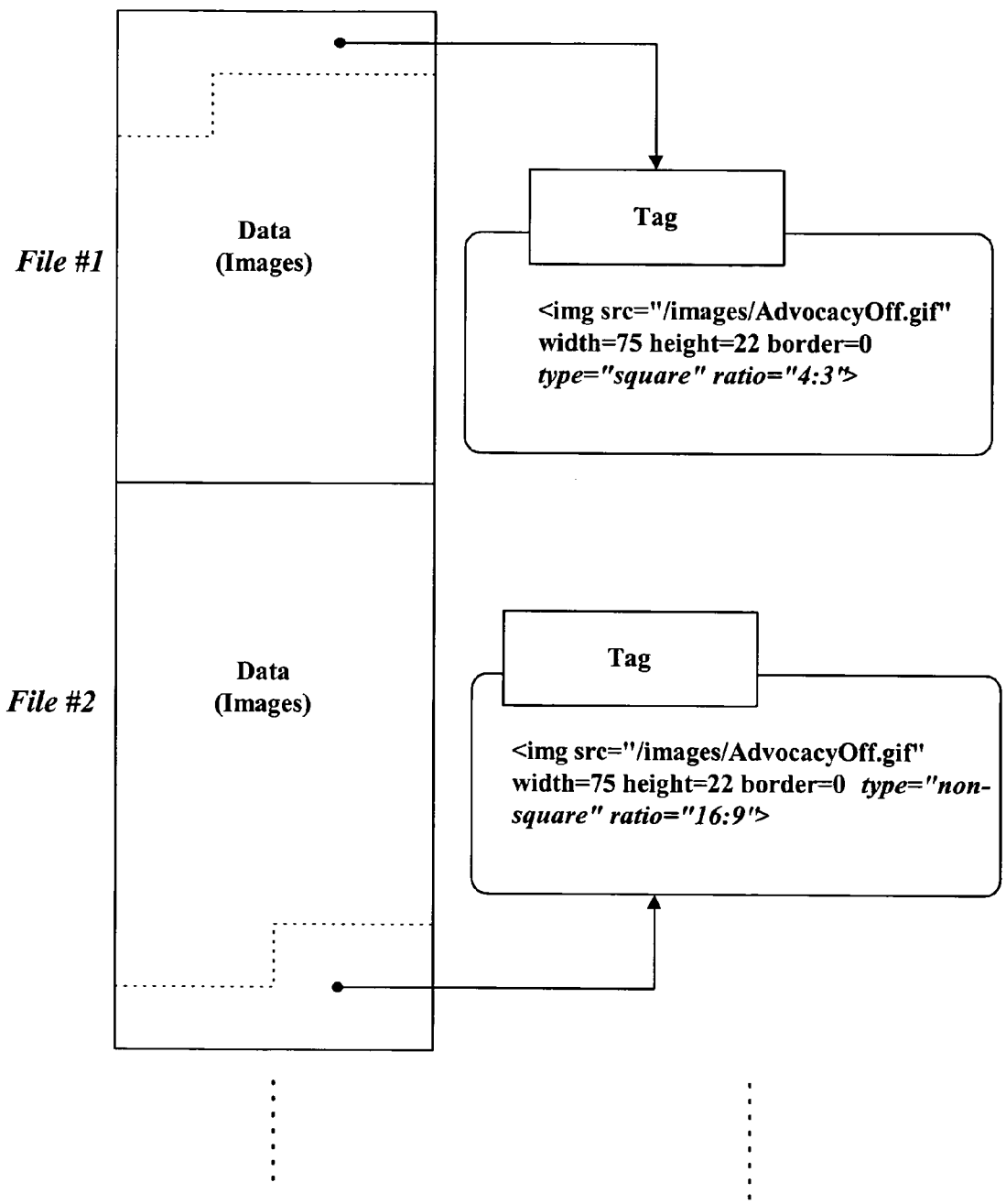
FIG. 6 illustrates a fourth embodiment of a method for recording attribute information for contents data files in accordance with the invention.

The attribute information may be included in tag information of a general data file as shown in FIG. 6. For example, the attribute information may be added to tag information, which is positioned at the head or tail of the data file, as image tag information.

Attribute information for File#1 indicating that 'Type=Square' and 'Ratio=4:3' is added to the tag information positioned at the head of File#1. Attribute information for File#2 indicating that 'Type=Non_Square' and 'Ratio=16:9' is added to the tag information positioned at the tail of File#2.

The microprocessor 13 determines the image type and aspect ratio of a data file from the tag information and controls the image of the contents data reproduced by the ENAV engine to be presented with the appropriate attributes in conjunction with the A/V data reproduced from the I-DVD 10.

By the aforementioned procedure, the interactive optical disk reproducing apparatus 100 can present ENAV contents data in synchronization with A/V data reproduced from the I-DVD 10 with an image type and aspect ratio appropriate for the contents data.

The attribute information may include other attributes as well as the image type and aspect ratio of contents data.

The method of presenting auxiliary data for an interactive recording medium in accordance with the present invention allows auxiliary contents data for A/V data recorded on the interactive recording medium to be presented appropriately according to the attributes of the contents data.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method of reproducing auxiliary contents data in a recording medium player, the method comprising:
receiving, by the recording medium player and from an external server, playback control information for the auxiliary contents data, the auxiliary contents data related to audio/video (A/V) recorded on a recording medium, the playback control information including
address information for indicating a location of the auxiliary contents data, and
attribute information, the attribute information including separate values for indicating an image type and an aspect ratio of the auxiliary contents data, the image type being one of "square" and "non-square" and the aspect ratio being one of 4:3 and 16:9;
storing, by the recording medium player, the playback control information in one region among at least two logically divided regions of a buffer memory;
checking, by the recording medium player, the attribute information stored in the one region of the buffer memory to determine a presentation method for the auxiliary contents data; and
presenting, by the recording medium player, the auxiliary contents data according to the determined presentation method,
wherein the step of presenting includes outputting the auxiliary contents data in conjunction with the A/V data reproduced from the recording medium using the image type and the aspect ratio included in the playback control information.

2. The method set forth in claim 1,
wherein the playback control information is further pre-recorded on the recording medium, and wherein the receiving step comprises retrieving the playback control information from the recording medium.

3. The method set forth in claim 1, wherein the auxiliary contents data is organized into one or more files.

4. The method set forth in claim 3, wherein the attribute information is included in names of the files containing the auxiliary contents data.

5. The method set forth in claim 3, wherein the attribute information is included in meta tag information in a header area of the files containing the auxiliary contents data.

6. The method set forth in claim 3, wherein the attribute information is included in tag information arbitrarily positioned within the files containing the auxiliary contents data as image tag information.

7. The method set forth in claim 1, wherein the presenting step comprises presenting the auxiliary contents data as square images if the image types indicate the images are square.

8. The method set forth in claim 1, wherein the presenting step comprises presenting the auxiliary contents data as 4:3 or 16:9 according to the aspect ratio.

9. The method set forth in claim 1,
wherein the receiving step includes receiving the auxiliary contents data from the recording medium or the external server, and
wherein the storing step includes storing the auxiliary contents data from the recording medium or the external server into the buffer memory.

10. The method set forth in claim 1, wherein the step of presenting includes outputting the auxiliary contents data in conjunction with the A/V data reproduced from an interactive recording medium.

11. The method set forth in claim 1, wherein the playback control information is provided all at once, and
wherein the receiving step includes receiving the playback control information at once.

12. The method set forth in claim 1, wherein the playback control information is divided into a plurality of pieces and provided one by one when need, and
wherein the receiving step includes receiving the playback control information one by one.

13. An recording medium player for reproducing auxiliary contents data, the recording medium player comprising:
a receiving unit configured to receive a playback control information for the auxiliary contents data, the auxiliary contents data related to audio/video (A/V) data recorded on a recording medium, the playback control information including
address information for indicating a location of the auxiliary contents data, and
attribute information, the attribute information including separate values for indicating an image type and an aspect ratio of the auxiliary contents data, the image type being one of "square" and "non-square" and the aspect ratio being one of 4:3 and 16:9;
a buffer memory logically divided in at least two regions in which any one region is configured to store the playback control information; and
a controller configured to check the attribute information stored in the region of the buffer memory to determine a presentation method for the auxiliary contents data, and to control a presentation of the auxiliary contents data according to the determined presentation method,
wherein the buffer memory is configured to store the auxiliary contents data received from the receiving unit according to a control of the controller, and
wherein the controller is configured to control the presentation of the auxiliary contents data in conjunction with the A/V data reproduced form the recording medium using the image type and the aspect ration included in the playback control information.

14. The recording medium player set forth in claim 13, wherein the playback control information is pre-recorded on the recording medium, and
wherein the receiving unit is configured to retrieve the playback control information from the recording medium.

15. The recording medium player set forth in claim 13, wherein the auxiliary contents data is organized into one or more files.

16. The recording medium player set forth in claim 15, wherein the attribute information is included in names of the files containing the auxiliary contents data.

17. The recording medium player set forth in claim 15, wherein the attribute information is included in meta tag information in a header area of the files containing the auxiliary contents data.

18. The recording medium player set forth in claim 15, wherein the attribute information is included in tag information arbitrarily positioned within the files containing the auxiliary contents data as image tag information.

19. The recording medium player set forth in claim 13, wherein the controller is configured to control the presentation of the auxiliary contents data as square images if the image types indicate the images are square.

20. The recording medium player set forth in claim 13, wherein the controller is configured to control the presentation of the auxiliary contents data as 4:3 or 16:9 according to the aspect ratio.

21. The recording medium player set forth in claim 13, wherein the auxiliary contents data is pre-recorded on an interactive recording medium or provided by an external server through a communication network, and
wherein the buffer memory is configured to store the auxiliary contents data according to a control of the controller.

22. The recording medium player set forth in claim 13, wherein the controller is configured to control the presentation of the auxiliary contents data in conjunction with the A/V data reproduced from the recording medium.

23. The recording medium player set forth in claim 13, wherein the playback control information is provided all at once, and
wherein the receiving unit is configured to receive the playback control information at once.

24. The recording medium player set forth in claim 13, wherein the playback control information is divided into a plurality of pieces and provided one by one when need, and
wherein the receiving unit is configured to receive the playback control information one by one.

* * * * *